(12) United States Patent
Choi

(10) Patent No.: US 7,804,653 B2
(45) Date of Patent: Sep. 28, 2010

(54) IMAGING OPTICAL SYSTEM FOR CAMERAS

(75) Inventor: Byung-ha Choi, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 112 days.

(21) Appl. No.: 12/288,065

(22) Filed: Oct. 16, 2008

(65) Prior Publication Data

US 2009/0231734 A1   Sep. 17, 2009

(30) Foreign Application Priority Data

Mar. 13, 2008   (KR) .................. 10-2008-0023432

(51) Int. Cl.
*G02B 9/12* (2006.01)
*G02B 13/18* (2006.01)
(52) U.S. Cl. ...................... 359/784; 359/716
(58) Field of Classification Search .......... 359/716, 359/784, 785
See application file for complete search history.

(56) References Cited

U.S. PATENT DOCUMENTS

| | | | |
|---|---|---|---|
| 6,775,072 B2 | 8/2004 | Sato | |
| 6,977,779 B2 | 12/2005 | Shinohara | |
| 7,099,092 B2 | 8/2006 | Sato | |
| 7,667,902 B2 * | 2/2010 | Do | 359/789 |
| 7,675,692 B2 * | 3/2010 | Do | 359/716 |

* cited by examiner

*Primary Examiner*—David N Spector
(74) *Attorney, Agent, or Firm*—Drinker Biddle & Reath LLP

(57) ABSTRACT

An imaging optical system for cameras comprising a stop, a first lens, a second lens, and a third lens in order from object side to image side. The first lens is convex at the object side, and has positive refractive power and both surfaces of which are aspherical. The second lens is convex at the image side and has negative refractive power. The third lens has a concave surface at its central portion facing the image side and a convex surface at its peripheral portions facing the image side. The imaging optical system satisfies the conditions of the following Inequalities:

$$0.8 < \frac{L}{2Y} < 1$$

$$0.5 < \frac{f1}{f} < 0.86$$

where L denotes the distance from the stop to the image focal point, 2Y denotes the diagonal length of the effective image surface, f denotes the overall focal distance of the imaging optical system, and f1 denotes the focal distance of the first lens.

6 Claims, 9 Drawing Sheets

IMAGING OPTICAL SYSTEM FOR CAMERAS

CROSS-REFERENCE TO RELATED PATENT APPLICATION

This application claims the benefit of Korean Patent Application No. 10-2008-0023432, filed on Mar. 13, 2008, in the Korean Intellectual Property Office, the disclosure of which is incorporated herein in its entirety by reference.

BACKGROUND OF THE INVENTION

1. Field of the Invention

The present invention relates to an imaging optical system for compact cameras.

2. Description of the Related Art

Digital cameras or video cameras that have solid state pickup devices, such as charge coupled devices (CCDs) or complementary metal-oxide semiconductors (CMOSs), are widely in use. In particular, mega-pixel camera modules are in demand, and cameras having at least 5 million pixels and providing high definition are being developed. Imaging optical apparatuses, such as digital cameras or cellular phone cameras that use pickup devices such as CCDs or CMOSs, are required to be compact, light, and cost-effective. Moreover, cameras in mobile phones should be compact in order to be used in image communications. In order to obtain compact and light cameras, an imaging optical system made up of three lenses is used.

When a camera module, included in a mobile apparatus for image communications, is comprised of three plastic lenses, ¼" camera modules are mainly used. When an imaging sensor is reduced in size, ¼" camera modules are mainly being used. In order to solve shading caused by the reduction in size of image sensors, as much ambient light as possible needs to be secured, and the telecentric characteristics of the lens system need to be set high. However, in a conventional case where an aperture stop is installed between the first lens and second lens, the telecentric characteristics are degraded, and a restrictive condition that an injection should be performed with a rib thickness, which deviates from an effective curvature, set to be less than or equal to 0.4 mm with a decrease in an overall height of a lens needs to be satisfied. This restrictive condition makes it difficult to mass produce. In addition, in a conventional case where a 0.3 mm infrared filter is used between a lens and an image sensor, the infrared filter should secure a long back focal length of about 1.1 mm. In order to meet these requirements, a precise lens designing technology for maintaining a high optical performance by appropriately arranging the refractive powers of lenses that constitute a photographing lens is needed.

SUMMARY OF THE INVENTION

The present invention provides a compact imaging optical system for use in high-resolution cameras, which provides high resolution, good telecentric characteristics, and a long back focal distance.

According to an aspect of the present invention, there is provided an imaging optical system comprising, in order from the object side to the image side: a stop; a first lens which is convex at the object side and has positive refractive power and both surfaces of which are aspherical; a second lens which is convex at the image side and has negative refractive power; and a third lens having a concave surface at its central portion facing the image side and a convex surface at its peripheral portions facing the image side, wherein the imaging optical system satisfies the conditions of the following Inequalities:

$$0.8 < \frac{L}{2Y} < 1$$

$$0.5 < \frac{f1}{f} < 0.86$$

where L denotes the distance from the stop to an image focal point, 2Y denotes the diagonal length of an effective image surface, f denotes the overall focal distance of the imaging optical system, and f1 denotes the focal distance of the first lens.

The refractive power of the third lens does not vary radially from an optical axis.

The first lens, the second lens, and the third lens may be aspherical.

The imaging optical system may satisfy a condition of the following Inequality:

$$-0.1 \leq S \leq 0$$

where S denotes the distance on the optical axis from the stop to the object-side surface of the first lens.

The imaging optical system may satisfy a condition of the following Inequality:

$$22 < V2 < 30$$

where V2 denotes an Abbe number of the second lens.

The imaging optical system may satisfy a condition of the following Inequality:

$$0.6 < \tan\theta < 0.65$$

where $\theta$ denotes a half angle of view of the diagonal length of the effective image surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An imaging optical system for cameras according to the present invention will now be described more fully with reference to the accompanying drawings, in which exemplary embodiments of the invention are shown.

Figure 1A:
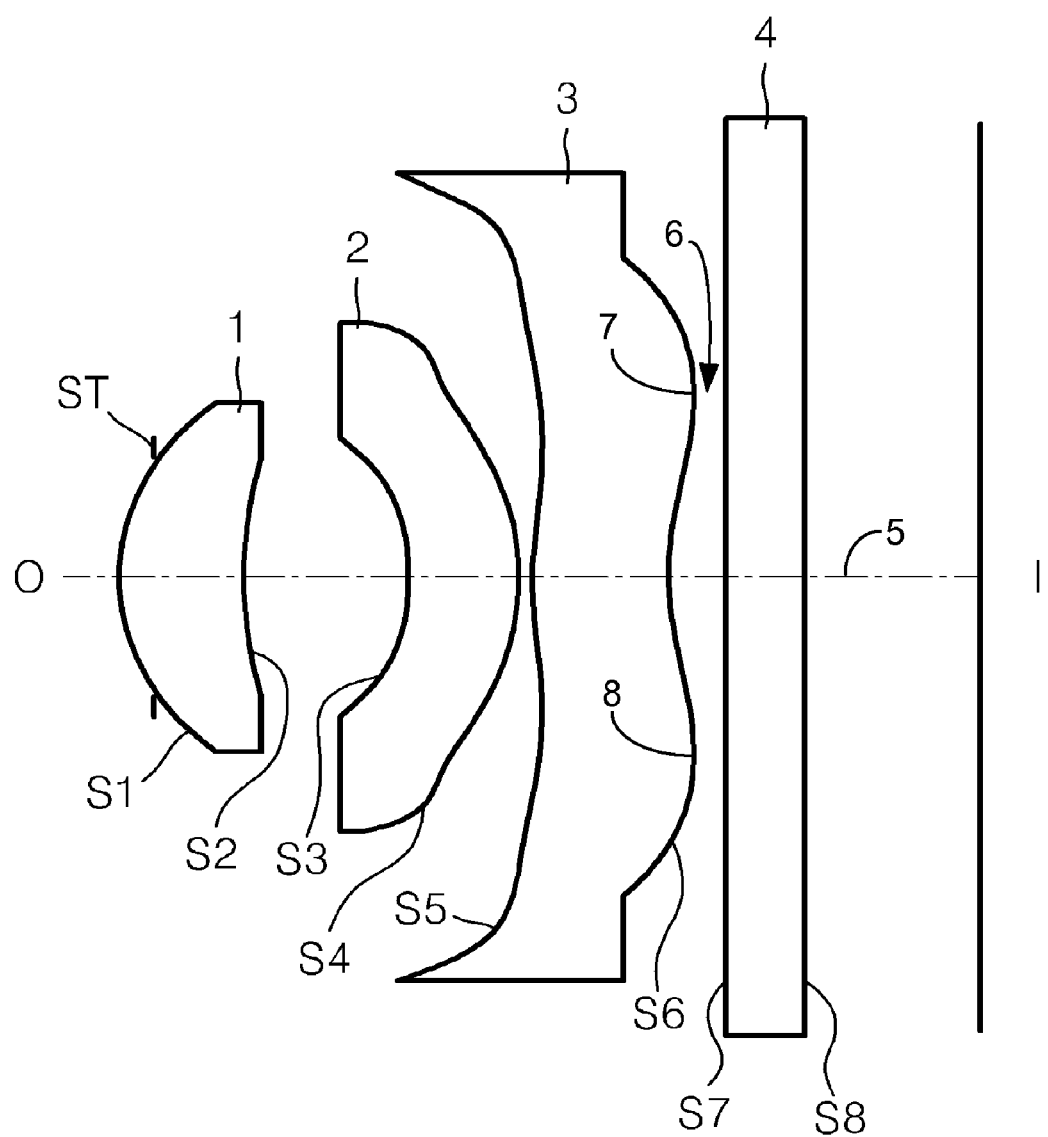
FIG. 1A illustrates an imaging optical system for image communications, according to a first embodiment of the present invention.

FIG. 1A illustrates an imaging optical system for image communications, according to a first embodiment of the present invention. Referring to FIG. 1A, the imaging optical system according to the current embodiment includes, in order from the object side O to an image side I, a stop ST, a first lens 1 having positive refractive power, a second lens 2 having negative refractive power, and a third lens 3 having negative refractive power. The first lens 1 has a convex surface on the object side O and a concave surface on the image side I, and the second lens 2 has a concave surface on the object side O and a convex surface on the image side I. The third lens 3 has a concave surface at its central portion facing the image side I, and a convex surface at its peripheral portions facing the image side I. An infrared filter 4 is disposed nearest to the image side I.

In the present invention, in order to obtain a compact imaging optical system that provides a high resolution, uses a small number of lenses, and has a small definition variation, the stop is disposed nearest to the object side so as to obtain good telecentric characteristics. Since the third lens 3 has a shape in which a central portion facing the image side I is concave and peripheral portions facing the image side I are convex, the third lens 3 has an inflection point that denotes a point on a lens surface at which a tangent angle to the lens surface changes from a gradual increase (or decrease) to a decrease (or increase) in a direction from the optical axis 5 to its peripheries. The refractive power of the third lens 3 does not change within an effective aperture 6 that denotes a highest location 7, 8 on a lens surface S6 that is passed by light having a maximum angle of view, that is, denotes a distance from the optical axis 5 to the highest location 7, 8. Both surfaces of each of the first, second, and third lenses 1, 2, and 3 may be aspherical.

Through the above-described configuration, the present invention may provide a compact lens system which has a high resolution and a short lens TTL (through the lens) and by which aberrations can be corrected. Spherical aberration and comatic aberration may be corrected by using an aspherical lens as the first lens 1; comatic aberration and astigmatism may be corrected by using an aspherical lens as the second lens 2; and aberration on an optical axis and several aberrations around the optical axis may be corrected by using an aspherical lens as the third lens 3.

According to the current embodiment of the present invention, the first lens 1 may be designed so as to satisfy the following conditions of Inequalities 1 and 2:

$$0.8 < \frac{L}{2Y} < 1 \quad (1)$$

$$0.5 < \frac{f1}{f} < 0.86 \quad (2)$$

where L denotes the distance from the stop to the image focal point, 2Y denotes the diagonal length of an effective image surface (i.e., the imaging sensor surface), f denotes the overall focal distance of the imaging optical system, and f1 denotes the focal distance of the first lens 1. When L/2Y of Inequality 1, which is for achieving miniaturization of a camera, does not exceed an upper limit, the overall length of the lens system can be decreased. When f1/f of Inequality 2, which is for achieving miniaturization of a camera, exists within a range as defined by Inequality 2, the miniaturization of a camera can be achieved.

An imaging optical system according to the present invention may satisfy the following condition of Inequality 3:

$$-0.1 \leq S \leq 0 \quad (3)$$

where S denotes a distance on the optical axis from the stop to the surface of the first lens, which is near to an object. In other words, the stop is located behind the surface of the first lens, which faces the object.

In Inequality 3, when S is greater than 0, telecentric characteristics can be secured, but the imaging optical system is so thick that it is difficult to miniaturize the camera, and the stop is too far away from the first lens and thus provides weak internal reflection. On the other hand, when S is less than a lower limit (i.e., −0.1), telecentric characteristics cannot be secured, and it is difficult to manufacture the stop by injection. Thus, an error is prone to occur during molding of the stop. In other words, when S deviates from the lower limit, molding of the stop is difficult because the stop needs to be thinned.

The imaging optical system according to the current embodiment of the present invention may satisfy the following condition of Inequality 4:

$$22 < V2 < 30 \quad (4)$$

where V2 denotes an Abbe number of the second lens 2. When the Abbe number of the second lens 2 is within the range of Inequality 4, chromatic aberration can be corrected. On the other hand, the overall length of the lens system can be decreased by setting the refractive index of the second lens 2 to be higher than those of the first and third lenses 1 and 3.

Figure 1B:
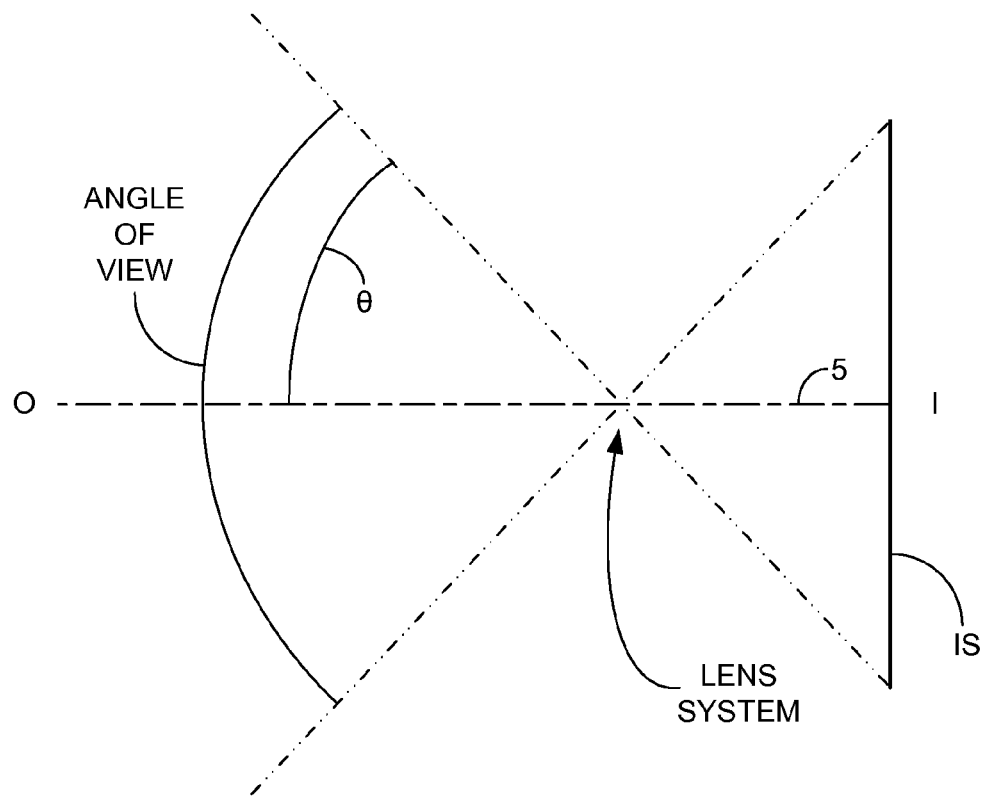
FIG. 1B illustrates a half angle of view of an effective image surface through a lens system along an optical axis from an object side to an image side.
Figure 1C:
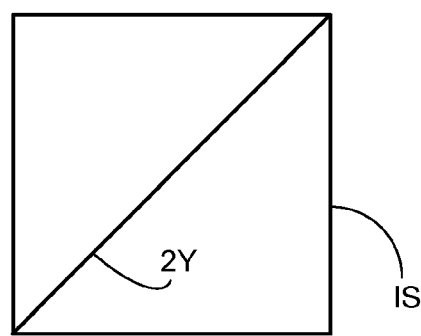
FIG. 1C illustrates a diagonal length of the effective image surface as viewed from the object side toward the image side.

FIG. 1B illustrates a half angle of view θ of an effective image surface IS through a lens system along the optical axis 5 from the object side O to the image side I. FIG. 1C illustrates the diagonal length 2Y of the effective image surface IS as viewed from the object side O toward the image side I. The imaging optical system according to the current embodiment of the present invention may satisfy the following condition of Inequality 5:

$$0.6 < \tan\theta < 0.65 \quad (5)$$

where θ denotes the half angle of view of the diagonal length 2Y of the effective image surface IS (i.e., the imaging sensor surface). In Inequality 5, which relates to an angle of view, when tan θ is less than or equal to the lower limit, definition may improve, but the TTL of the lens increases. When tan θ is equal to or greater than the lower limit, the overall length of the lens system may decrease, but it is difficult to match an incidence angle of peripheral light beams with an incidence angle of main light beams of the imaging sensor.

When a direction of an optical axis is set to be an x axis and a direction perpendicular to the optical axis direction is set to be a y axis, a proceeding direction of a light beam is set to be forward, and in this state an aspherical shape of a lens according to the present invention may be expressed as Equation 6:

$$x = \frac{cy^2}{1 + \sqrt{1-(K+1)c^2y^2}} + Ay^4 + By^6 + Cy^8 + Dy^{10} + Ey^{12} \quad (6)$$

where x denotes the distance from the apex of the lens along the optical axis direction, y denotes the distance from the apex of the lens along the direction perpendicular to the optical axis, K denotes a conic constant, A, B, C, D, E, F, G, and H denote aspherical coefficients, and c denotes the reciprocal (1/R) of the radius of curvature of the apex of the lens.

In the present invention, lenses conforming to optimization conditions for achieving miniaturization of a zoom lens are included through embodiments based on the following various designs.

Hereinafter, f is referred to as a combined focal distance of the entire lens system, Fno is referred to as the F number, w is referred to as a half angle of view, R is referred to as the radius of curvature, Dn is referred to as a center thickness of a lens or an interval between lenses, Nd is referred to as a refractive index, Vd is referred to as an Abbe number, ST is referred to as a stop, OBJ is referred to as an object surface, I is referred to as an image surface, and ASP is referred to as an aspherical surface.

FIG. 1A illustrates an imaging optical system for image communications, according to a first embodiment of the present invention, and which has the following characteristics.

| f: 2.76 Fno: 2.8 ω: 32.25 | | | | |
|---|---|---|---|---|
| | R | Dn | Nd | Vd |
| OBJ: | INFINITY | 1400.000000 | | |
| ST: | INFINITY | −0.100000 | | |
| S1: | 0.89690 | 0.460000 | 1.531 | 56.51 |
| | ASP: | | | |
| K: | 0.430377 | | | |
| A: | −0.846245E−01 | B: 0.215637E+00 | C: | −0.162448E+01 |
| D: | 0.405874E+01 | E: −0.642838E+01 | | |
| S2: | 2.59351 | 0.170000 | | |
| | ASP: | | | |
| K: | 3.352090 | | | |
| A: | 0.821955E−01 | B: −.423162E+00 | C: | 0.140635E+01 |
| D: | −.207230E+01 | E: −.393986E+01 | | |
| S3: | −0.88000 | 0.400000 | 1.632 | 23 |
| | ASP: | | | |
| K: | 1.273568 | | | |
| A: | 0.491478E+00 | B: −0.129174E+01 | C: | 0.295110E+01 |
| D: | −0.191477E+01 | E: 0.664157E+01 | | |
| S4: | −1.06595 | 0.050000 | | |
| | ASP: | | | |
| K: | −0.756870 | | | |
| A: | 0.128209E−01 | B: −0.929073E−01 | C: | −0.125766E+00 |
| D: | 0.144264E+01 | E: −0.116059E+01 | | |
| S5: | 1.79446 | 0.500000 | 1.531 | 56.51 |
| | ASP: | | | |
| K: | −17.731341 | | | |
| A: | −0.360165E+00 | B: 0.200717E+00 | C: | 0.152149E−01 |
| D: | −0.358462E−01 | E: 0.581458E−02 | | |
| S6: | 1.31181 | 0.208533 | | |

| -continued | | | | |
|---|---|---|---|---|
| f: 2.76 Fno: 2.8 ω: 32.25 | | | | |
| | R | Dn | Nd | Vd |
| OBJ: | INFINITY | 1400.000000 | | |
| ST: | INFINITY | −0.100000 | | |
| S1: | 0.89690 | 0.460000 | 1.531 | 56.51 |
| | ASP: | | | |
| K: | −7.740246 | | | |
| A: | −0.294766E+00 | B: 0.203975E+00 | C: | −0.146446E+00 |
| D: | 0.536306E−01 | E: −0.816649E−02 | | |
| S7: | INFINITY | 0.300000 | 1.516 | 64.2 |
| S8: | INFINITY | 0.631467 | | |
| I: | INFINITY | 0.000000 | | |

Figure 2:
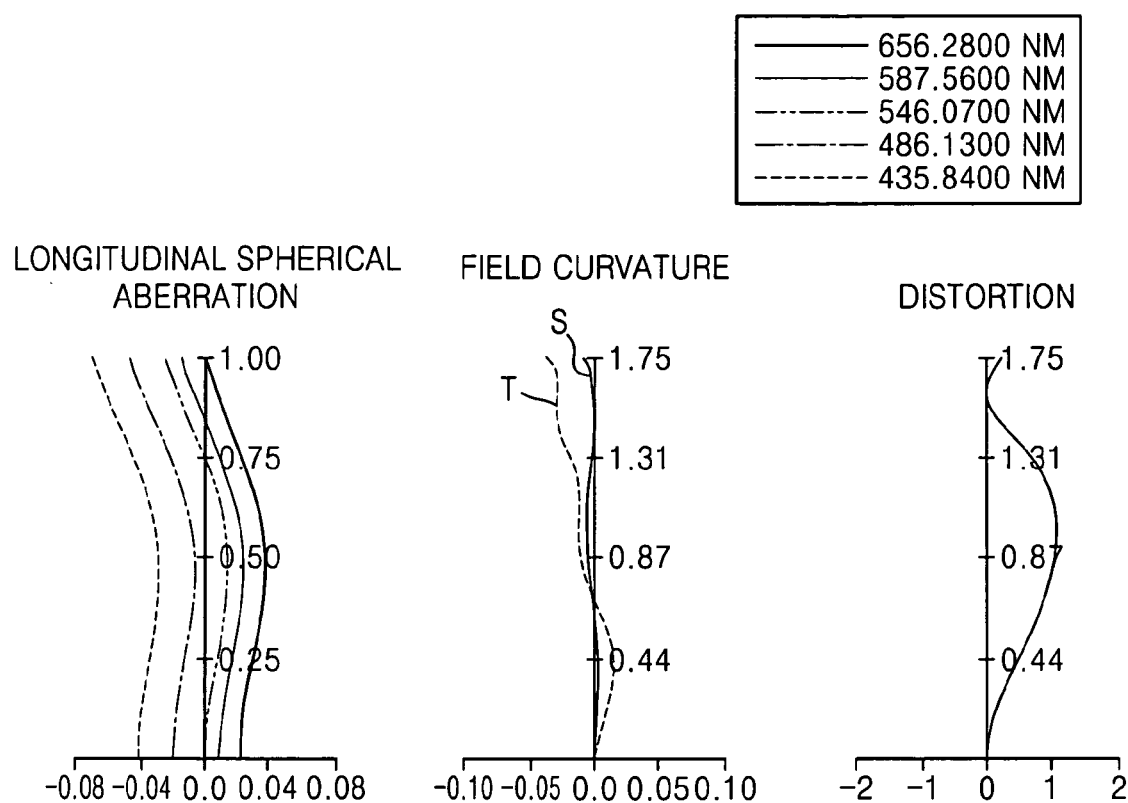
FIG. 2 illustrates the spherical aberration, the field curvature, and the distortion of the imaging optical system illustrated in FIG. 1A.

FIG. 2 illustrates the spherical aberration, the field curvature, and the distortion of the imaging optical system illustrated in FIG. 1A. A tangential field curvature (T) and sagittal field curvature (S) are illustrated as the field curvature.

Figure 3:
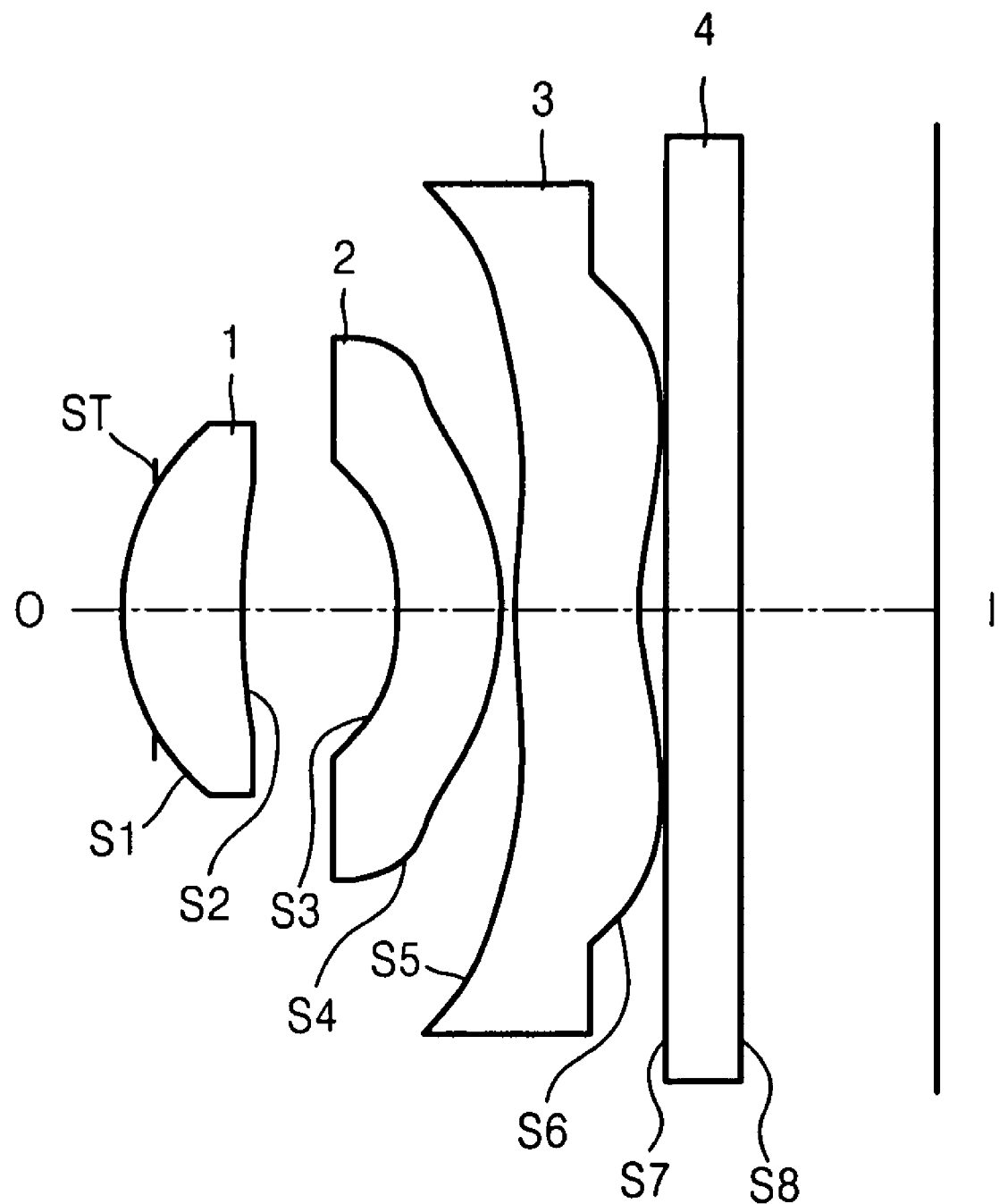
FIG. 3 illustrates an imaging optical system for image communications, according to a second embodiment of the present invention.

FIG. 3 illustrates an imaging optical system for image communications, according to a second embodiment of the present invention, and which has the following characteristics.

| f: 2.76 Fno: 2.8 ω: 32.09 | | | | |
|---|---|---|---|---|
| | R | Dn | Nd | Vd |
| OBJ: | INFINITY | 1400.000000 | | |
| ST: | INFINITY | −0.100000 | | |
| S1: | 0.90587 | 0.460000 | 1.531 | 56.51 |
| | ASP: | | | |
| K: | 0.406238 | | | |
| A: | −0.778033E−01 | B: 0.189123E+00 | C: | −0.161484E+01 |
| D: | 0.357597E+01 | E: −0.543533E+01 | | |
| S2: | 2.73326 | 0.181140 | | |
| | ASP: | | | |
| K: | 1.340496 | | | |
| A: | 0.579620E−01 | B: −0.251286E+00 | C: | 0.979316E+00 |
| D: | −0.395475E+01 | E: −0.133100E+01 | | |
| S3: | −0.88843 | 0.400000 | 1.632 | 23 |
| | ASP: | | | |
| K: | 1.332790 | | | |
| A: | 0.478998E+00 | B: −.152997E+01 | C: | 0.311449E+01 |
| D: | −.358939E+00 | E: 0.486558E+01 | | |
| S4: | −1.12412 | 0.050000 | | |
| | ASP: | | | |
| K: | −0.585828 | | | |
| A: | −0.330112E−01 | B: −0.907730E−01 | C: | −0.731120E−01 |
| D: | 0.147360E+01 | E: −0.121026E+01 | | |
| S5: | 1.81044 | 0.500000 | 1.531 | 56.51 |
| | ASP: | | | |
| K: | −20.510965 | | | |
| A: | −0.353421E+00 | B: 0.193293E+00 | C: | 0.111712E−01 |
| D: | −0.360592E−01 | E: 0.702587E−02 | | |
| S6: | 1.45055 | 0.100000 | | |
| | ASP: | | | |
| K: | −9.141477 | | | |
| A: | −0.263556E+00 | B: 0.167882E+00 | C: | −0.131878E+00 |
| D: | 0.554299E−01 | E: −0.107953E−01 | | |
| S7: | INFINITY | 0.300000 | 1.516 | 64.2 |
| S8: | INFINITY | 0.739994 | | |
| I: | INFINITY | 0.000000 | | |

Figure 4:
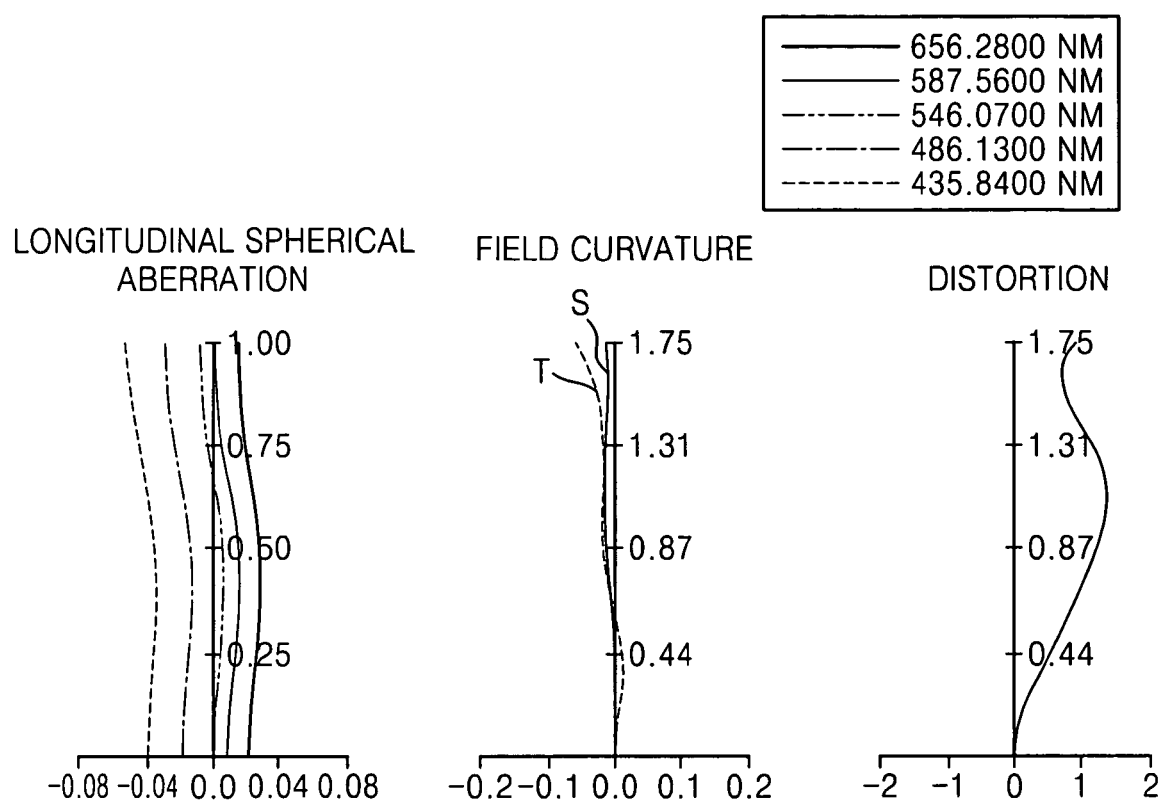
FIG. 4 illustrates the spherical aberration, the field curvature, and the distortion of the imaging optical system illustrated in FIG. 3.

FIG. 4 illustrates the spherical aberration, the field curvature, and the distortion of the imaging optical system illustrated in FIG. 3.

Figure 5:
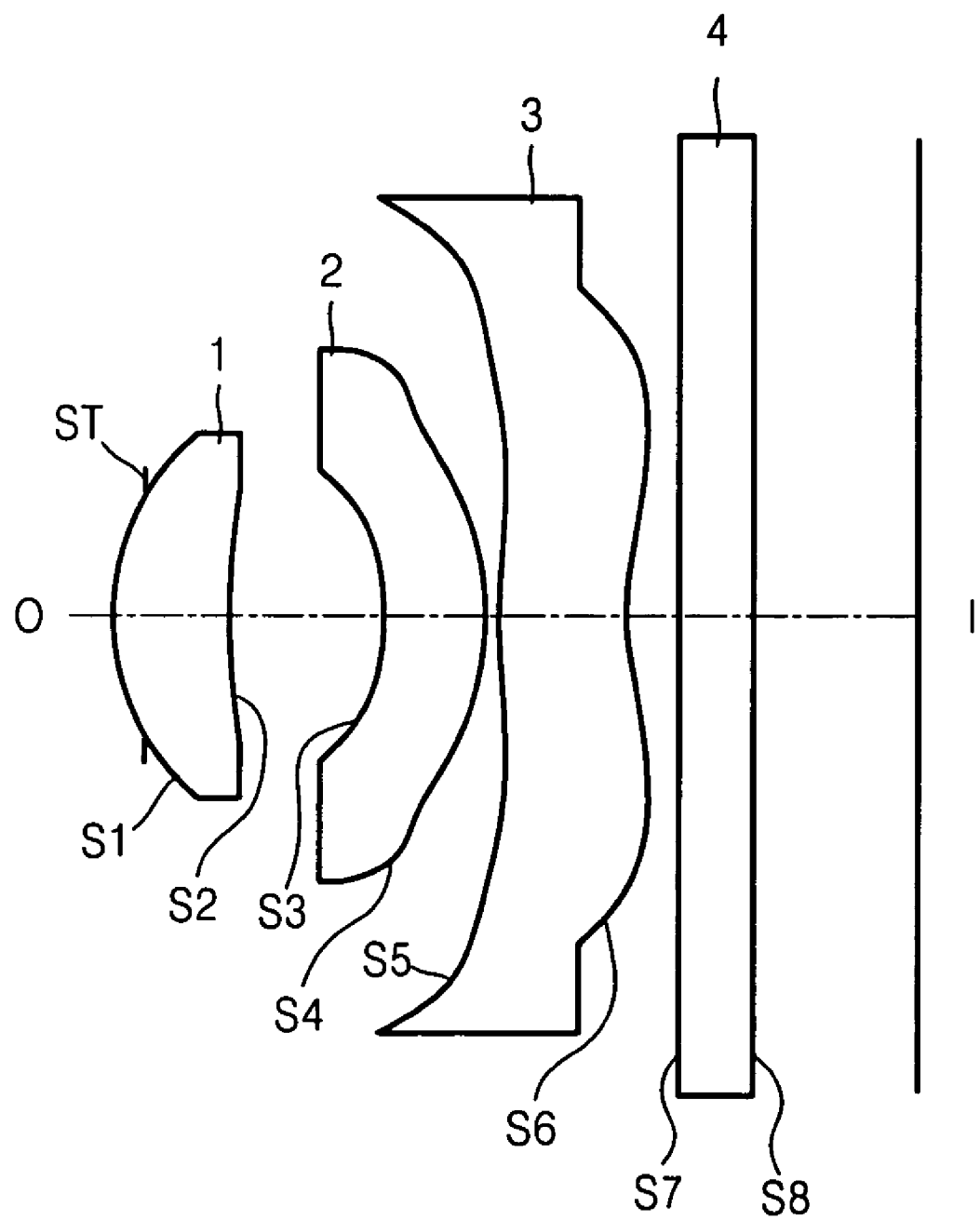
FIG. 5 illustrates an imaging optical system for image communications, according to a third embodiment of the present invention.

FIG. 5 illustrates an imaging optical system for image communications, according to a third embodiment of the present invention, and which has the following characteristics.

| f: 2.76 Fno: 2.8 ω: 32.08 | | | | |
|---|---|---|---|---|
| | R | Dn | Nd | Vd |
| OBJ: | INFINITY | 1400.000000 | | |
| ST: | INFINITY | −0.100000 | | |
| S1: | 0.90745 | 0.460000 | 1.531 | 56.51 |
| | ASP: | | | |

K: 0.414623
A: −0.748947E−01  B: 0.195879E+00  C: −0.159913E+01
D: 0.364742E+01  E: −0.543537E+01

| S2: | 2.67138 | 0.184049 | | |
|---|---|---|---|---|
| | ASP: | | | |

K: 1.346283
A: 0.581323E−01  B: −0.243611E+00  C: 0.106135E+01
D: −0.362646E+01  E: −0.133100E+01

| S3: | −0.88960 | 0.400000 | 1.632 | 23 |
|---|---|---|---|---|
| | ASP: | | | |

K: 1.317311
A: 0.448364E+00  B: −0.148259E+01  C: 0.318630E+01
D: −0.860654E+00  E: 0.486558E+01

| S4: | −1.10329 | 0.050000 | | |
|---|---|---|---|---|
| | ASP: | | | |

K: −0.561505
A: −0.356472E−01  B: −0.950943E−01  C: −0.761971E−01
D: 0.147439E+01  E: −0.120438E+01

| S5: | 1.77725 | 0.500000 | 1.531 | 56.51 |
|---|---|---|---|---|
| | ASP: | | | |

K: −22.950790
A: −0.347373E+00  B: 0.195018E+00  C: 0.112489E−01
D: −0.364140E−01  E: 0.665366E−02

| S6: | 1.39245 | 0.200000 | | |
|---|---|---|---|---|
| | ASP: | | | |

K: −10.272520
A: −0.253544E+00  B: 0.165384E+00  C: −0.132327E+00
D: 0.559006E−01  E: −0.104271E−01

| S7: | INFINITY | 0.300000 | 1.516 | 64.2 |
|---|---|---|---|---|
| S8: | INFINITY | 0.639994 | | |
| I: | INFINITY | 0.000000 | | |

Figure 6:
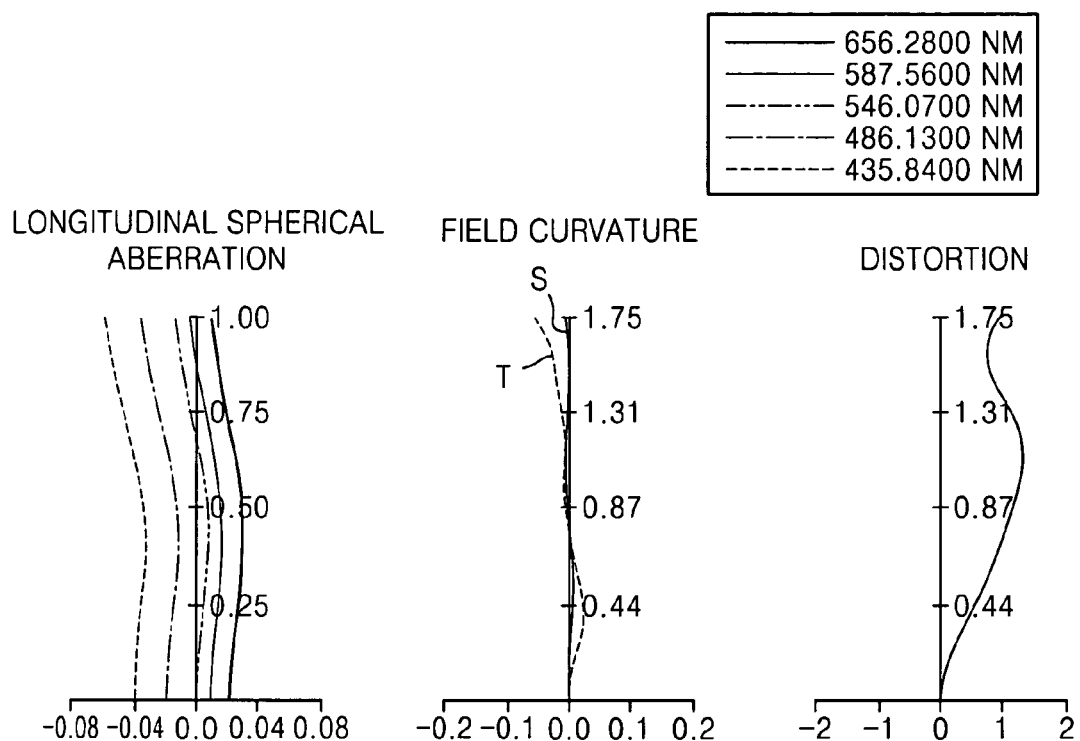
FIG. 6 illustrates the spherical aberration, the field curvature, and the distortion of the imaging optical system illustrated in FIG. 5.

FIG. 6 illustrates the spherical aberration, the field curvature, and the distortion of the imaging optical system illustrated in FIG. 5.

Figure 7:
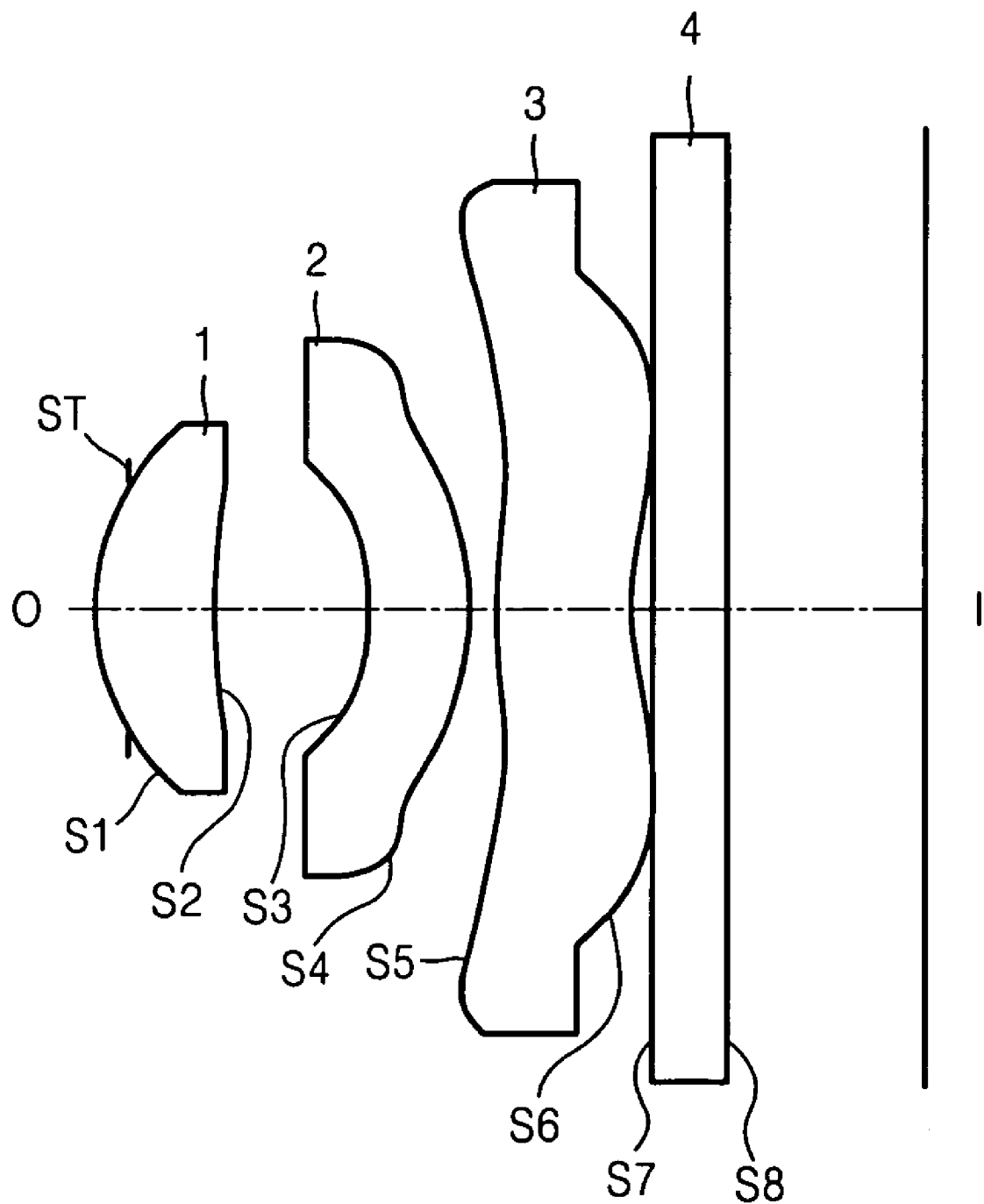
FIG. 7 illustrates an imaging optical system for image communications, according to a fourth embodiment of the present invention.

FIG. 7 illustrates an imaging optical system for image communications, according to a fourth embodiment of the present invention, and which has the following characteristics.

| f: 2.76 Fno: 2.8 ω: 32.22 | | | | |
|---|---|---|---|---|
| | R | Dn | Nd | Vd |
| OBJ: | INFINITY | 1400.000000 | | |
| ST: | INFINITY | −0.100000 | | |
| S1: | 0.91338 | 0.425000 | 1.531 | 56.51 |
| | ASP: | | | |

K: 0.341426
A: −0.689190E−01  B: 0.295313E+00  C: −0.182579E+01
D: 0.419564E+01  E: −0.579055E+01

| S2: | 2.85999 | 0.304207 | | |
|---|---|---|---|---|

-continued

| f: 2.76 Fno: 2.8 ω: 32.22 | | | | |
|---|---|---|---|---|
| | R | Dn | Nd | Vd |
| | ASP: | | | |

K: 7.127693
A: 0.324412E−01  B: −0.202654E+00  C: 0.439671E+00
D: −0.992633E+00  E: −0.514875E+01

| S3: | −0.90089 | 0.400000 | 1.632 | 23 |
|---|---|---|---|---|
| | ASP: | | | |

K: 1.308201
A: 0.469572E+00  B: −0.128474E+01  C: 0.259568E+01
D: 0.680141E+00  E: 0.427546E+01

| S4: | −1.14020 | 0.100000 | | |
|---|---|---|---|---|
| | ASP: | | | |

K: −1.182634
A: −0.668187E−01  B: −0.606803E−01  C: −0.139595E−01
D: 0.141091E+01  E: −0.120182E+01

| S5: | 1.84572 | 0.522991 | 1.531 | 56.51 |
|---|---|---|---|---|
| | ASP: | | | |

K: −18.692535
A: −0.353803E+00  B: 0.190978E+00  C: 0.106045E−01
D: −0.364721E−01  E: 0.808693E−02

| S6: | 1.47068 | 0.075000 | | |
|---|---|---|---|---|
| | ASP: | | | |

K: −8.333856
A: −0.278066E+00  B: 0.177717E+00  C: −0.131018E+00
D: 0.535350E−01  E: −0.102912E−01

| S7: | INFINITY | 0.300000 | 1.516 | 64.2 |
|---|---|---|---|---|
| S8: | INFINITY | 0.755000 | | |
| I: | INFINITY | 0.000000 | | |

Figure 8:
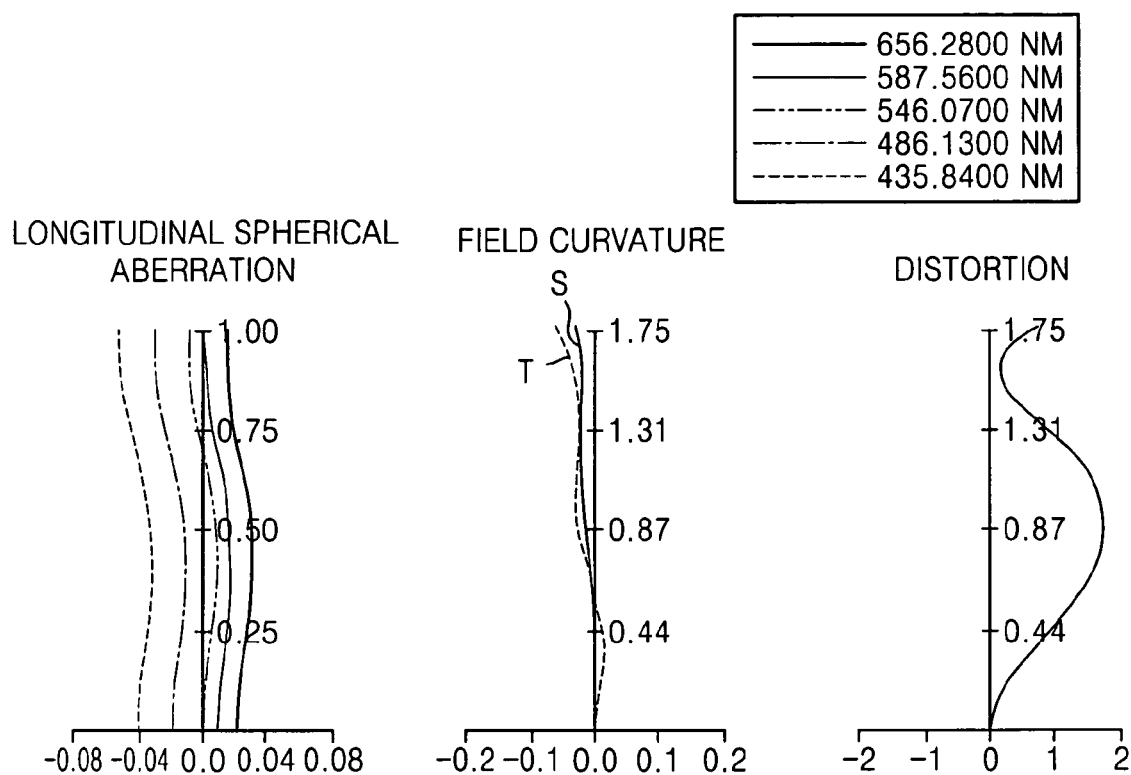
FIG. 8 illustrates the spherical aberration, the field curvature, and the distortion of the imaging optical system illustrated in FIG. 7.

FIG. 8 illustrates the spherical aberration, the field curvature, and the distortion of the imaging optical system illustrated in FIG. 7.

Table 1 shows that the first through fourth embodiments satisfy the conditions of Inequalities 1 through 5.

TABLE 1

| | First embodiment | Second embodiment | Third embodiment | Fourth embodiment |
|---|---|---|---|---|
| Inequality 1 | 0.9 | 0.9028 | 0.9045 | 0.9091 |
| Inequality 2 | 0.8477 | 0.8405 | 0.8514 | 0.8439 |
| Inequality 3 | −0.1 | −0.1 | −0.1 | −0.1 |
| Inequality 4 | 23 | 23 | 23 | 23 |
| Inequality 5 | 0.63 | 0.627 | 0.626 | 0.635 |

The present invention provides an imaging optical system of a compact camera lens that can be installed in mobile apparatuses such as mobile phones or PDAs. The imaging optical system is applicable to cameras that use imaging devices such as CCDs or CMOSs. The imaging optical system according to the present invention provides good telecentric characteristics, and has a short length and a long back focal distance.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An imaging optical system comprising, in a sequence from an object side to an image side:
   a stop;
   a first lens which is convex at the object side and has positive refractive power and both surfaces of which are aspherical;
   a second lens which is convex at the image side and has negative refractive power; and
   a third lens having a concave surface at its central portion facing the image side and a convex surface at its peripheral portions facing the image side,
   wherein the refractive power of the third lens does not change within an effective aperture that denotes a distance from the optical axis to a highest location on a surface of the third lens,
   wherein the imaging optical system satisfies the conditions of the following Inequalities:

$$0.8 < \frac{L}{2Y} < 1$$
   $$0.5 < \frac{f1}{f} < 0.86$$

where L denotes the distance from the stop to the image focal point, 2Y denotes the diagonal length of the effective image surface, f denotes the overall focal distance of the imaging optical system, and f1 denotes the focal distance of the first lens.

2. The imaging optical system of claim 1, wherein the first lens, the second lens, and the third lens are aspherical.

3. The imaging optical system of claim 1, wherein the imaging optical system satisfies the condition of the following Inequality:

$$-0.1 \leq S \leq 0$$

where S denotes the distance on the optical axis from the stop to the object-side surface of the first lens.

4. The imaging optical system of claim 1, wherein the imaging optical system satisfies the condition of the following Inequality:

$$22 < V2 < 30$$

where V2 denotes the Abbe number of the second lens.

5. An imaging optical system comprising, in a sequence from an object side to an image side:
   a stop;
   a first lens which is convex at the object side and has positive refractive power and both surfaces of which are aspherical;
   a second lens which is convex at the image side and has negative refractive power; and
   a third lens having a concave surface at its central portion facing the image side and a convex surface at its peripheral portions facing the image side,
   wherein the imaging optical system satisfies the conditions of the following Inequalities:

$$0.8 < \frac{L}{2Y} < 1$$
   $$0.5 < \frac{f1}{f} < 0.86$$

where L denotes the distance from the stop to the image focal point, 2Y denotes the diagonal length of the effective image surface, f denotes the overall focal distance of the imaging optical system, f1 denotes the focal distance of the first lens, V2 denotes the Abbe number of the second lens, and $\theta$ denotes the half angle of view of the diagonal length of the effective image surface.

6. An imaging optical system comprising, in a sequence from an object side to an image side:
   a stop;
   a first lens which is convex at the object side and has positive refractive power and both surfaces of which are aspherical;
   a second lens which is convex at the image side and has negative refractive power; and
   a third lens having a concave surface at its central portion facing the image side and a convex surface at its peripheral portions facing the image side,
   wherein the imaging optical system satisfies the conditions of the following Inequalities:

$$0.8 < \frac{L}{2Y} < 1$$
   $$0.5 < \frac{f1}{f} < 0.86$$
   $$0.6 < \tan\theta < 0.65$$

where L denotes the distance from the stop to the image focal point, 2Y denotes the diagonal length of the effective image surface, f denotes the overall focal distance of the imaging optical system, f1 denotes the focal distance of the first lens, and $\theta$ denotes the half angle of view of the diagonal length of the effective image surface.

* * * * *